US012636713B2

(12) United States Patent
de Souza Filho et al.

(10) Patent No.: US 12,636,713 B2
(45) Date of Patent: May 26, 2026

(54) MODULAR HYDRAULIC CHUCK

(71) Applicant: KENNAMETAL INC., Latrobe, PA (US)

(72) Inventors: Ruy Frota de Souza Filho, Latrobe, PA (US); Santhosha Boregowda, Bangalore (IN)

(73) Assignee: KENNAMETAL INC., Latrobe, PA (US)

( * ) Notice: Subject to any disclaimer, the term of this patent is extended or adjusted under 35 U.S.C. 154(b) by 241 days.

(21) Appl. No.: 18/359,381

(22) Filed: Jul. 26, 2023

(65) Prior Publication Data

US 2025/0033122 A1 Jan. 30, 2025

(51) Int. Cl.
B23B 31/117 (2006.01)
B23B 31/30 (2006.01)

(52) U.S. Cl.
CPC .......... B23B 31/305 (2013.01); B23B 31/302 (2013.01); B23B 31/1178 (2013.01); B23B 2231/365 (2013.01)

(58) Field of Classification Search
CPC ................ B23B 31/305; B23B 31/302; B23B 2231/356; B23B 31/1176
See application file for complete search history.

(56) References Cited

U.S. PATENT DOCUMENTS

| | | | | | |
|---|---|---|---|---|---|
| 1,656,624 A | * | 1/1928 | Finsen | ................ | B23B 31/4026 |
| | | | | | 279/136 |
| 2,684,854 A | * | 7/1954 | Hohwart | ............... | B23B 31/402 |
| | | | | | 279/2.17 |

| | | | | | |
|---|---|---|---|---|---|
| 2,788,979 A | * | 4/1957 | Skillin | .................. | B23B 31/204 |
| | | | | | 279/46.9 |
| 2,958,533 A | * | 11/1960 | Benjamin et al. | .............. | 279/51 |
| 3,202,432 A | * | 8/1965 | Cameron | .............. | B23B 31/305 |
| | | | | | 242/576.1 |
| 3,592,482 A | * | 7/1971 | Better | ................... | B23B 31/305 |
| | | | | | 279/4.06 |
| 4,349,207 A | * | 9/1982 | Fink | .................. | B23B 31/16254 |
| | | | | | 279/121 |

(Continued)

FOREIGN PATENT DOCUMENTS

| | | |
|---|---|---|
| CN | 209754048 U | 12/2019 |
| CN | 111390215 A | 7/2020 |

(Continued)

OTHER PUBLICATIONS

Oct. 9, 2025 Foreign Office Action German Application No. DE102024207037.8, 08 pages.

(Continued)

*Primary Examiner* — Sara Addisu
(74) *Attorney, Agent, or Firm* — Christopher J. Owens

(57) ABSTRACT

A hydraulic chuck may include an expansion sleeve, a plurality of pistons, and an actuator ring. The expansion sleeve may include a bore. The plurality of pistons may be axially mounted in at least one piston chamber of the expansion sleeve. The actuator ring may be rotatably mounted relative to the expansion sleeve. The actuator ring may be configured to actuate the plurality of pistons in the at least one piston chamber to hydraulically expand the expansion sleeve to provide a varying clamping force within the bore.

12 Claims, 5 Drawing Sheets

(56) References Cited

U.S. PATENT DOCUMENTS

| | | | | |
|---|---|---|---|---|
| 4,387,906 | A * | 6/1983 | Nicolin | B23B 31/204 |
| | | | | 279/2.07 |
| 4,411,568 | A * | 10/1983 | Rohm | B23B 31/265 |
| | | | | 408/239 R |
| 4,580,796 | A * | 4/1986 | Baur | B23B 31/204 |
| | | | | 279/4.07 |
| 4,844,489 | A * | 7/1989 | Acker, III | B23B 31/1223 |
| | | | | 279/4.06 |
| 5,067,861 | A * | 11/1991 | Danielsen | B23B 31/305 |
| | | | | 408/239 R |
| 5,127,780 | A * | 7/1992 | Massa | B23Q 3/086 |
| | | | | 279/2.01 |
| 5,551,710 | A | 9/1996 | Bruchman | |
| 5,906,378 | A * | 5/1999 | Nordquist | B23B 31/1071 |
| | | | | 219/69.15 |
| 6,311,987 | B1 * | 11/2001 | Rinne | B23B 31/305 |
| | | | | 409/234 |
| 6,473,954 | B1 * | 11/2002 | Rosberg | B23B 31/1172 |
| | | | | 279/4.09 |
| 6,641,128 | B2 * | 11/2003 | Fries | B23Q 11/005 |
| | | | | 279/4.06 |
| 2001/0026050 | A1 | 10/2001 | Barbieux | |
| 2005/0280216 | A1 * | 12/2005 | Han | B23B 31/4006 |
| | | | | 279/2.02 |
| 2007/0090611 | A1 * | 4/2007 | Soroka | B23B 31/16287 |
| | | | | 279/4.12 |
| 2007/0145692 | A1 * | 6/2007 | Herud | B23B 31/305 |
| | | | | 279/2.06 |
| 2007/0216113 | A1 * | 9/2007 | Schuster | B23B 31/402 |
| | | | | 279/2.08 |
| 2011/0057397 | A1 * | 3/2011 | Timtner | B23B 31/16258 |
| | | | | 279/2.21 |
| 2013/0292913 | A1 * | 11/2013 | Teusch | B23B 31/1178 |
| | | | | 279/2.06 |
| 2014/0197607 | A1 * | 7/2014 | Doi | B23B 31/1172 |
| | | | | 279/4.03 |
| 2016/0368064 | A1 * | 12/2016 | Boregowda | B23B 51/12 |
| 2018/0369931 | A1 * | 12/2018 | Boregowda | B23B 31/305 |
| 2019/0001420 | A1 * | 1/2019 | Teusch | B23B 31/305 |
| 2019/0168311 | A1 | 6/2019 | Haimer | |
| 2020/0276654 | A1 | 9/2020 | Chen | |
| 2021/0252609 | A1 | 8/2021 | Schäperkötter | |
| 2022/0152709 | A1 | 5/2022 | Herzog | |
| 2023/0356304 | A1 | 11/2023 | Retzbach | |

FOREIGN PATENT DOCUMENTS

| | | | | |
|---|---|---|---|---|
| DE | 2530993 | A1 | 1/1977 | |
| DE | 3213483 | A * | 10/1983 | B23B 31/204 |
| DE | 102010008872 | A1 | 8/2011 | |
| DE | 102012215036 | A1 | 10/2013 | |
| DE | 102015122763 | A1 * | 8/2016 | B23B 31/202 |
| DE | 102015120971 | A1 * | 6/2017 | B23B 31/1178 |
| DE | 102016116164 | A1 | 3/2018 | |
| DE | 102020117384 | A1 | 1/2022 | |
| EP | 3815822 | A1 | 5/2021 | |
| JP | 2020138310 | A | 9/2020 | |
| TW | 131396 | Y | 3/1990 | |
| WO | 2003095132 | A1 | 11/2003 | |
| WO | WO-2008054295 | A1 * | 5/2008 | F16D 1/091 |
| WO | 2017064332 | A1 | 4/2017 | |
| WO | WO22091521 | A1 | 5/2022 | |

OTHER PUBLICATIONS

Oct. 21, 2025 Non Final Rejection U.S. Appl. No. 18/226,538, 29 Pages.
Machine Translation WO 03/095132 A1, which WO '132 was published Nov. 20, 2003.

* cited by examiner

170

172

ROTATING AN ACTUATOR RING OF A HYDRAULIC
CHUCK TO ACTUATE A PLURALITY OF PISTONS
AXIALLY MOUNTED WITHIN AT LEAST ONE PISTON
CHAMBER OF AN EXPANSION SLEEVE OF THE
HYDRAULIC CHUCK

174

EXPANDING THE EXPANSION SLEEVE TO
PROVIDE A VARYING CLAMPING FORCE WITHIN
A BORE OF THE HYDRAULIC CHUCK

MODULAR HYDRAULIC CHUCK

FIELD OF THE DISCLOSURE

The disclosure relates to modular hydraulic chucks utilizing a plurality of pistons to apply varying clamping force.

BACKGROUND

The joints of hydraulic chuck are typically brazed or welded. Brazing is often a highly sensitive and timely process. This is inefficient and cost time and money. Due to the joints of hydraulic joints typically being permanent, when these joints experience oil leakage the entire hydraulic chuck often has to be replaced. This is also costly and inefficient.

A hydraulic chuck is needed which will resolve one or more issues associated with existing hydraulic chucks and their method of use.

SUMMARY

In one embodiment, a hydraulic chuck may be disclosed. The hydraulic chuck may include an expansion sleeve, a plurality of pistons, and an actuator ring. The expansion sleeve may include a bore. The plurality of pistons may be axially mounted in at least one piston chamber of the expansion sleeve. The actuator ring may be rotatably mounted relative to the expansion sleeve. The actuator ring may be configured to actuate the plurality of pistons in the at least one piston chamber to hydraulically expand the expansion sleeve to provide a varying clamping force within the bore.

In another embodiment, a method of hydraulically actuating a hydraulic chuck may be disclosed. In one step, an actuator ring of the hydraulic chuck may be rotated to actuate a plurality of pistons axially mounted within at least one piston chamber of an expansion sleeve of the hydraulic chuck. In another step, the expansion sleeve may be expanded to provide a varying clamping force within a bore of the hydraulic chuck.

The scope of the present disclosure is defined solely by the appended claims and is not affected by the statements within this summary.

BRIEF DESCRIPTION OF THE DRAWINGS

The disclosure can be better understood with reference to the following drawings and description. The components in the figures are not necessarily to scale, emphasis instead being placed upon illustrating the principles of the disclosure.

DETAILED DESCRIPTION

Figure 1:
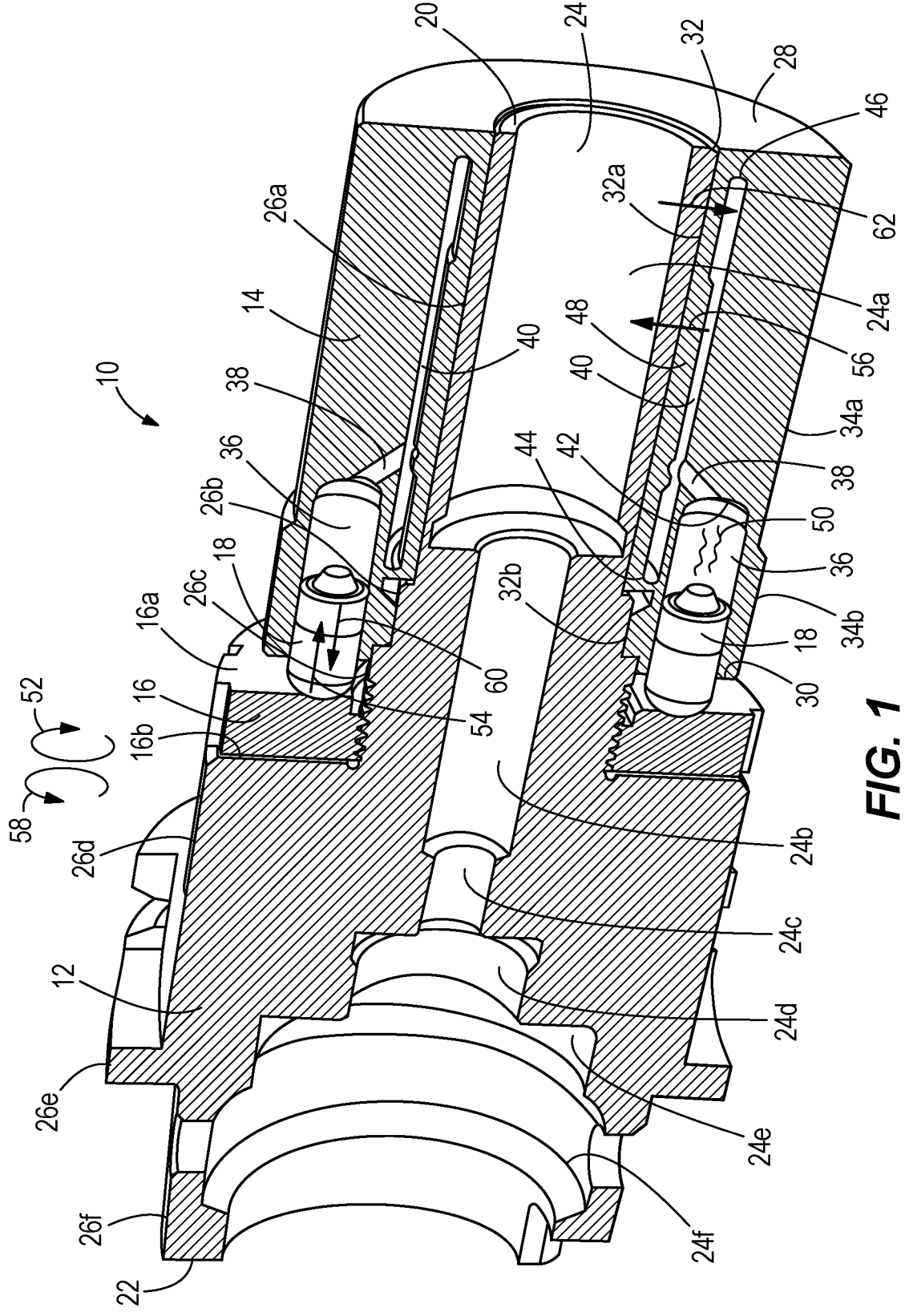
FIG. 1 illustrates a perspective longitudinal cross-section view of one embodiment of a hydraulic chuck with an actuator ring in a first position with the hydraulic chuck unclamped.
Figure 2:
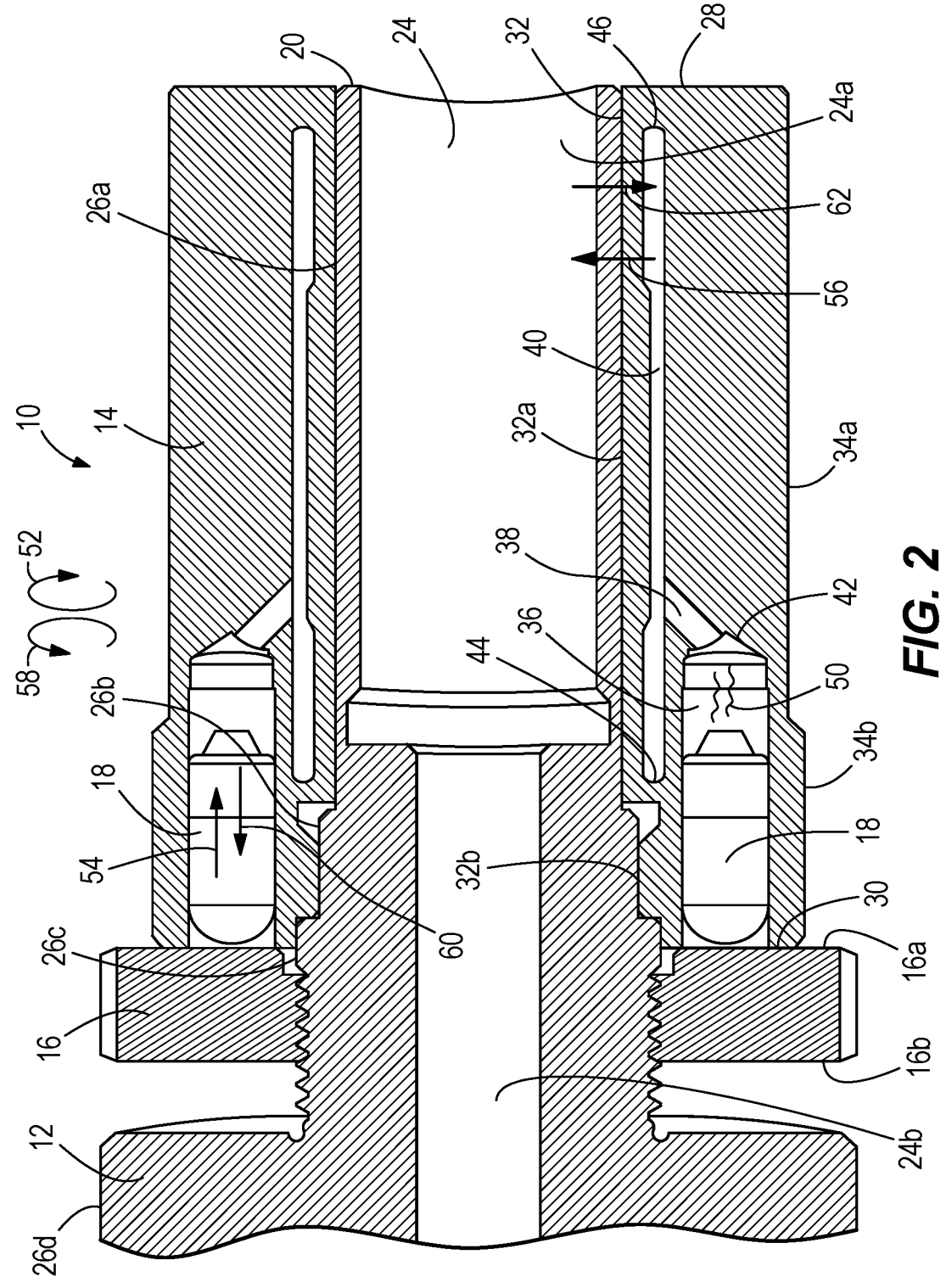
FIG. 2 illustrates a partial side longitudinal cross-section view of the hydraulic chuck of FIG. 1 with the actuator ring in a second position with the hydraulic chuck clamped.

As shown collectively in FIGS. 1-2, in one embodiment a hydraulic chuck 10 may comprise a tool support member 12, an expansion sleeve 14, an actuator ring 16, and a plurality of pistons 18. In other embodiments, the hydraulic chuck 10 may comprise varying components.

The tool support member 12 may comprise ends 20 and 22, an inner bore 24 extending between ends 20 and 22, and a plurality of shaft segments 26a, 26b, 26c, 26d, 26e, and 26f extending between ends 20 and 22. The inner bore 24 may vary in diameter between the ends 20 and 22. The inner bore 24 may comprise bore segments 24a, 24b, 24c, 24d, 24e, and 24f. Bore segment 24a may have a larger diameter than bore segment 24b. Bore segment 24b may have a larger diameter than bore segment 24c. Bore segment 24c may have a smaller diameter than bore segment 24d. Bore segment 24d may be the same diameter as bore segment 24a, but may have a smaller diameter than the diameter of bore segment 24e. Bore segment 24e may have a smaller diameter than bore segment 24f. Bore segment 24f may have the largest diameter of the bore segments 24a-24f of the inner bore 24. Shaft segment 26b may have a larger diameter than shaft segment 26a. Shaft segment 26a may be flexible. Shaft segment 26c may be threaded and may have a larger diameter than shaft segment 26b. Shaft segment 26d may have a larger diameter than shaft segment 26c. Shaft segment 26e may have a larger diameter than shaft segment 26d. Shaft segment 26f may have a larger diameter than shaft segments 26a, 26b, and 26c, but may have a smaller diameter than shaft segments 26d and 26e. The tool support member 12 may be made of steel using a machining or molding process. In other embodiments, the tool support member 12 may be made of varying materials.

The expansion sleeve 14 may be fixedly and directly attached to the tool support member 12 with a mechanical fit, an interference fit, a shrink fit, or though other attachment mechanisms. In one embodiment, the expansion sleeve 14 may be made of a hard elastomer which may have large, quick expansion properties resulting in manufacturing and cost benefits. The expansion sleeve 14 may comprise ends 28 and 30, an inner bore 32 extending between ends 28 and 30, a plurality of shaft segments 34a and 34b extending between ends 28 and 30, at least one piston chamber 36 disposed at end 30, at least one passageway 38, and at least one pressure chamber 40. The inner bore 32 may vary in diameter between the ends 28 and 30. The inner bore 32 may comprise bore segments 32a and 32b. Bore segment 32a may have a smaller diameter than bore segment 32b. Shaft segment 34b may have a larger diameter than shaft segment 34a. Shaft segment 26b of the tool support member 12 may interact with bore segment 36b of the expansion sleeve 14 in a precision sliding/transition fit, a tapered fit, or in other embodiments with varying fits. The at least one piston chamber 36 may extend axially from the end 30 to inner location 42 disposed between ends 28 and 30. In one embodiment, there may comprise a plurality of piston chambers 36. In other embodiments, there may only comprise one piston chamber 36. The at least one pressure chamber 40 may be disposed between the at least one piston chamber 36 and bore segment 32a. The at least one pressure chamber 40 may extend axially from inner location 44 to inner location 46. The at least one pressure chamber 40 may be adjacent to bore segment 32a. In one embodiment, there may comprise a plurality of pressure chambers 40. In other embodiments, there may only comprise one pressure chamber 40. The at least one passageway 38 may connect the at least one piston chamber 36 to the at least one pressure chamber 40. In one embodiment, there may comprise a plurality of passageways 38. In other embodiments, there may comprise only one passageway 38. The inner wall 48 of the expansion sleeve 14 between the at least one pressure chamber 40 and the bore segment 32*a* may be flexible. The expansion sleeve 14 may be printed and may be made of a harder material than the tool support member 12 such as carbide steel. In other embodiments, the expansion sleeve 14 may be made of varying materials.

The plurality of pistons 18 may be axially mounted in the at least one piston chamber 36 of the expansion sleeve 14. Hydraulic fluid 50 may be disposed in the at least one piston chamber 36, the at least one passageway 38, and the at least one chamber 40 under pressure supplied by the plurality of pistons 18.

The actuator ring 16 may be threaded. The actuator ring 16 may be rotatably mounted to shaft segment 26*c*, which may also be threaded, of the tool support member 12. The actuator ring 16 may be disposed between the tool support member 12 and the expansion sleeve 14. The actuator ring 16 may be disposed adjacent the at least one piston chamber 36 of the expansion sleeve 14 with the plurality of pistons 18 abutting against end 16*a* of the expansion sleeve 14. As the actuator ring 16 is rotated in clockwise direction 52, the actuator ring 16 may advance in axial direction 54 relative to the tool support member 12 and the expansion sleeve 14 actuating the plurality of pistons 18 causing the plurality of pistons 18 to move in axial direction 54 within the at least one piston chamber 36 of the expansion sleeve 14. The movement of the plurality of pistons 18 in direction 54 may compress the hydraulic fluid 50 in the at least one piston chamber 36 causing the hydraulic fluid 50 to move from the at least one piston chamber 36, through the at least one passageway 38, to the at least one pressure chamber 40. This may cause the hydraulic fluid 50 in the at least one pressure chamber 40 to expand the inner wall 48 of the expansion sleeve 14 in direction 56 causing in turn shaft segment 26*a* of the tool support member 12 to expand in direction 56. Shaft segment 26*a* may in turn then apply a clamping force on a tool shaft (not shown) disposed in bore segment 24*a* of bore 24 of the tool support member 12. The clamping force may vary as the actuator ring 16 is rotated in clockwise direction 52. For instance, in one embodiment the clamping force may continually increase as the actuator ring 16 is rotated in clockwise direction 42. In another embodiment, the clamping force may increase in different amounts at different times as the actuator ring 16 is rotated in clockwise direction 42.

Figure 3:
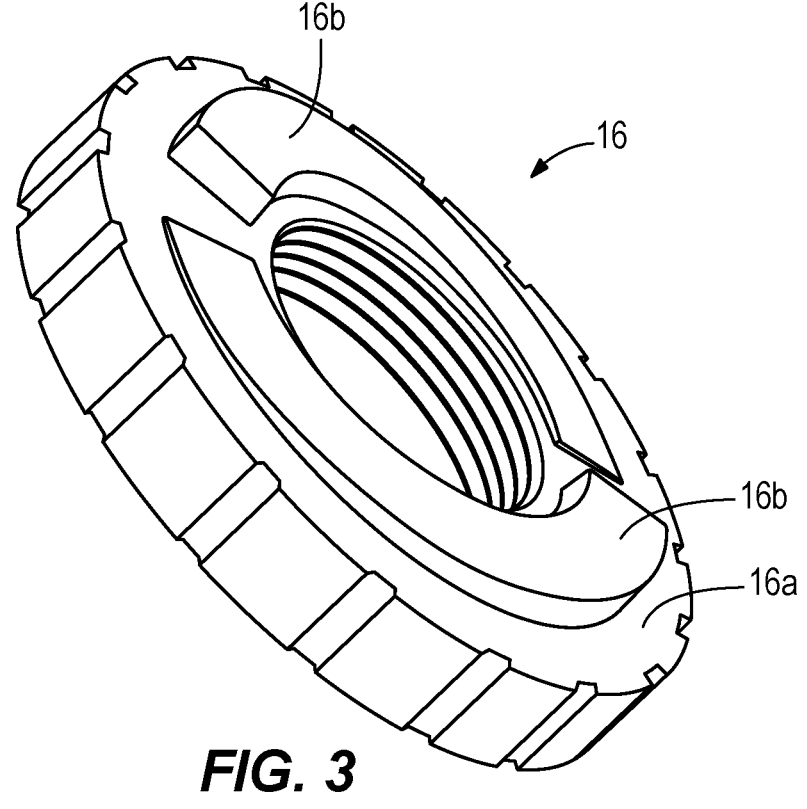
FIG. 3 illustrates a perspective view of one embodiment of a cam profile of an actuator ring.
Figure 4:
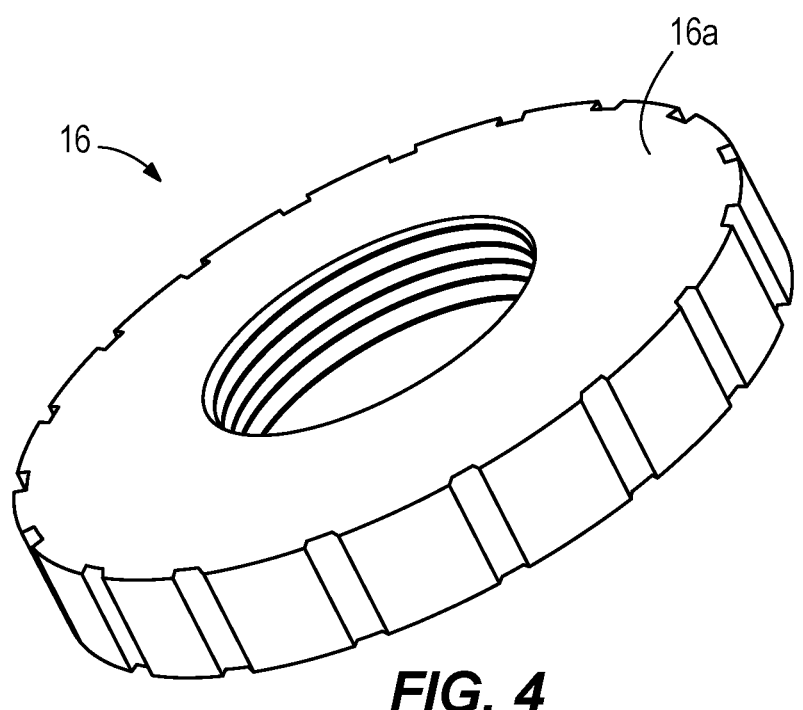
FIG. 4 illustrates a perspective view of another embodiment of a cam profile of an actuator ring.

As shown in FIG. 3, in one embodiment, end 16*a* of the actuator ring 16 may comprise a cam profile 16*b* which is configured to apply a non-constant level of hydraulic expansion to the expansion sleeve 14 (shown in FIGS. 1-2) as the actuator ring 16 is rotated relative to the expansion sleeve 14 and the tool support member 12 (shown in FIGS. 1-2). As shown in FIG. 4, in another embodiment, end 16*a* of the actuator ring 16 may comprise a constant profile which is configured to apply a constant level of hydraulic expansion to the expansion sleeve 14 as the actuator ring 16 is rotated relative to the expansion sleeve 14 and the tool support member. In yet another embodiment, end 16*a* of the actuator ring 16 may comprise a profile which minimizes the amount of rotation to just ½ of a rotation. In still other embodiments, end 16*a* of the actuator ring 16 may have varying profiles to achieve varying parameters. The threads of the actuator ring 16 may be varied in size to varying amounts of force as the actuator ring 16 is rotated. For instance, in one embodiment the threads of the actuator ring 16 may be sized to allow the actuator ring 16 to be rotated by hand to achieve clamping and unclamping. The cam profile may be printed or manufactured using varying manufacturing methods.

When the actuator ring 16 is moved in counter-clockwise direction 58 the actuator ring 16 may move relative to the tool support member 12 and the expansion member 14 in direction 60 decompressing the hydraulic fluid 50 in the at least one piston chamber 36 causing the hydraulic fluid 50 to move from the at least one pressure chamber 40, through the at least one passageway 38, to the at least one piston chamber 36. This movement of the hydraulic fluid 50 out of the at least one pressure chamber 40 may allow the inner wall 48 of the expansion sleeve to compress in direction 62 causing in turn shaft segment 26*a* of the tool support member 12 to compress in direction 62. Shaft segment 26*a* may in turn then release a clamping force on a tool shaft (not shown) disposed in bore segment 24*a* of bore 24 of the tool support member 12. The clamping force may vary as the actuator ring 16 is rotated in counter-clockwise direction 58. For instance, in one embodiment the clamping force may continually decrease as the actuator ring 16 is rotated in counter-clockwise direction 58. In another embodiment, the clamping force may decrease in different amounts at different times as the actuator ring 16 is rotated in counter-clockwise direction 58.

In one embodiment, the expansion sleeve 14 may comprise only one pressure chamber 40 containing hydraulic fluid 50 which may be connected through that at least one passageway 38 to the at least one piston chamber 36. The at least one piston chamber 36 may comprise a plurality of piston chambers 36 each respectively holding its own respective piston 18.

In another embodiment, the expansion sleeve 14 may comprise a plurality of pressure chambers 40 containing hydraulic fluid 50 which may each be separately connected through passageways 38 to different piston chambers 36. Each piston chamber 36 may comprise different pressurizations and each may hold its own respective piston 18.

In one embodiment, the plurality of pistons 18 may comprise different sizes.

In another embodiment, the actuator ring 16 may be configured to simultaneously actuate the plurality of pistons 18 in the at least one piston chamber 36 to hydraulically expand the expansion sleeve 14 to provide a varying clamping force within the bore segment 24*a* of bore 24 of the tool support member 12.

In still another embodiment, the actuator ring 16 may be configured to actuate at least some of the plurality of pistons 18 in the at least one piston chamber 36 at different times to hydraulically expand the expansion sleeve 14 to provide a varying clamping force within the bore segment 24*a* of bore 24 of the tool support member 12.

In still other embodiments, the actuator ring 16 may be configured to actuate a varying number of pistons 18 in a varying number of piston chambers 36 at varying times in varying amounts to provide a varying clamping force within the bore segment 24*a* of bore 24 of the tool support member.

In additional embodiments, one or more components of the hydraulic chuck 10 may further vary in structure or function, one or more components of the hydraulic chuck 10 may not be present, or one or more additional components one or more varying functions made be added.

Figure 5:
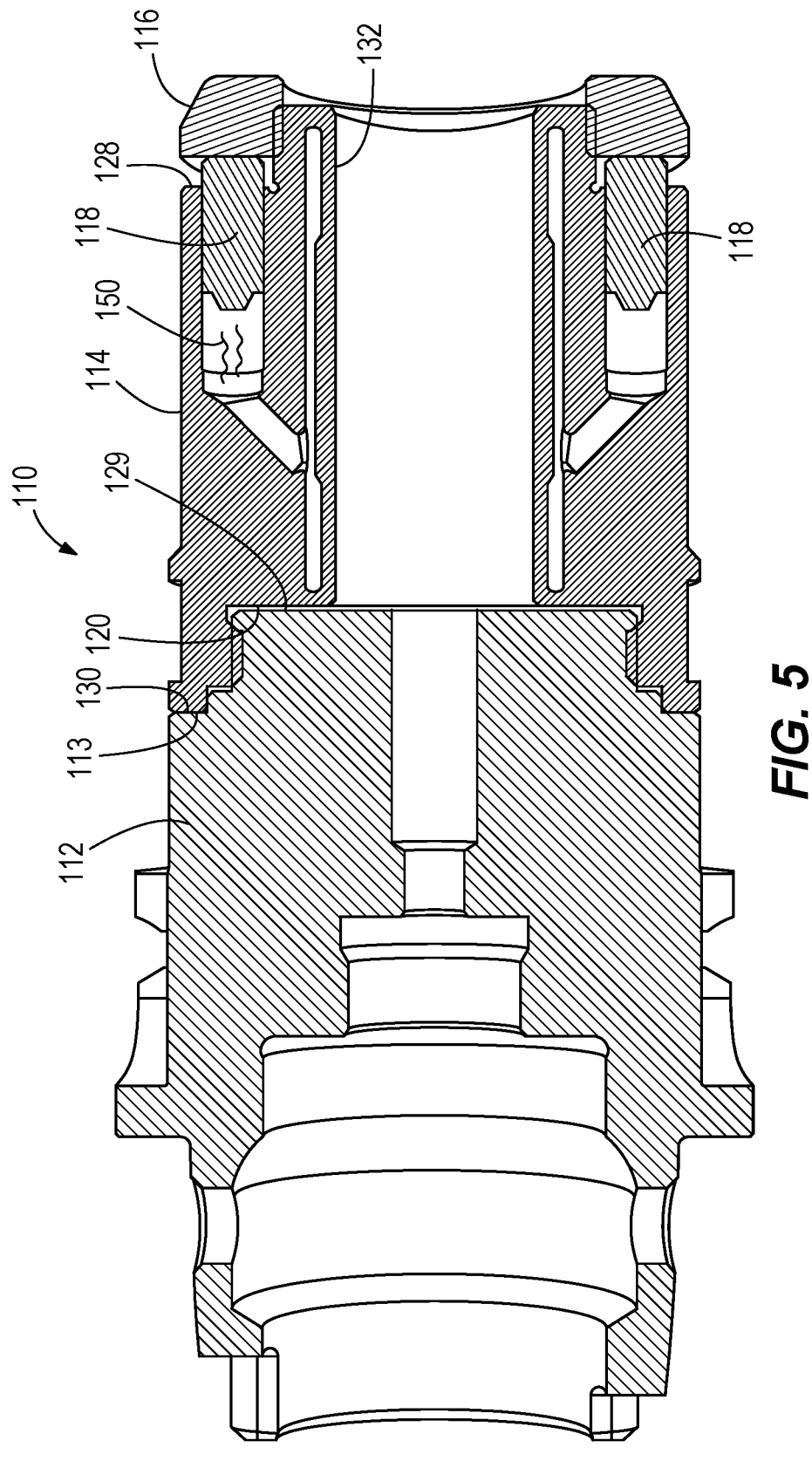
FIG. 5 illustrates a side longitudinal cross-section view of another embodiment of a hydraulic chuck with an actuator ring in a first position with the hydraulic chuck unclamped.

FIG. 5 illustrates another embodiment of a hydraulic chuck 110. The hydraulic chuck of FIG. 5 may be different from the hydraulic chuck 10 of FIGS. 1-2 in that the expansion sleeve 114 may be disposed between the tool support member 112 and the actuator ring 116. Unlike in the embodiment of FIGS. 1-2, the actuator ring 116 may be disposed at end 128 of the expansion sleeve 114. The actuator ring 116 may function in the same manner as the actuator ring 16 of FIGS. 1-2 to, as the actuator ring 116 is rotated, actuate the plurality of pistons 118 to vary the hydraulic force of the hydraulic fluid 150 to apply a varying level of clamping force within inner bore 132 of the expansion sleeve 114. However, unlike in the embodiment of FIGS. 1-2, the varying clamping force applied by the actuator ring 116 may be applied through the expansion sleeve 114 directly to a tool shaft (not shown) disposed within the inner bore 132 directly in contact with the expansion sleeve 114. Unlike in the embodiment of FIGS. 1-2, end 120 of the tool support member 112 may be disposed directly against inner surface 129 of the expansion sleeve 114. Inner surface 129 may be disposed proximate end 130 of the expansion sleeve 114. Similarly, end 130 of the expansion sleeve 114 may be disposed directly against surface 113 of the tool support member 112. Surface 113 may be disposed proximate end 120 of the tool support member 112. The tool support member 112 may be directly fixedly attached to the expansion sleeve 114 utilizing a mechanical fit, an interference fit, a shrink fit, or another type of attachment mechanism. The tool support member 112 may be fitted to the expansion sleeve 114 utilizing a precision sliding/transition fit, a tapered fit, or in other embodiments varying fits. In additional embodiments, one or more components of the hydraulic chuck 110 may further vary in structure or function, one or more components of the hydraulic chuck 110 may not be present, or one or more additional components one or more varying functions made be added.

Figure 6:
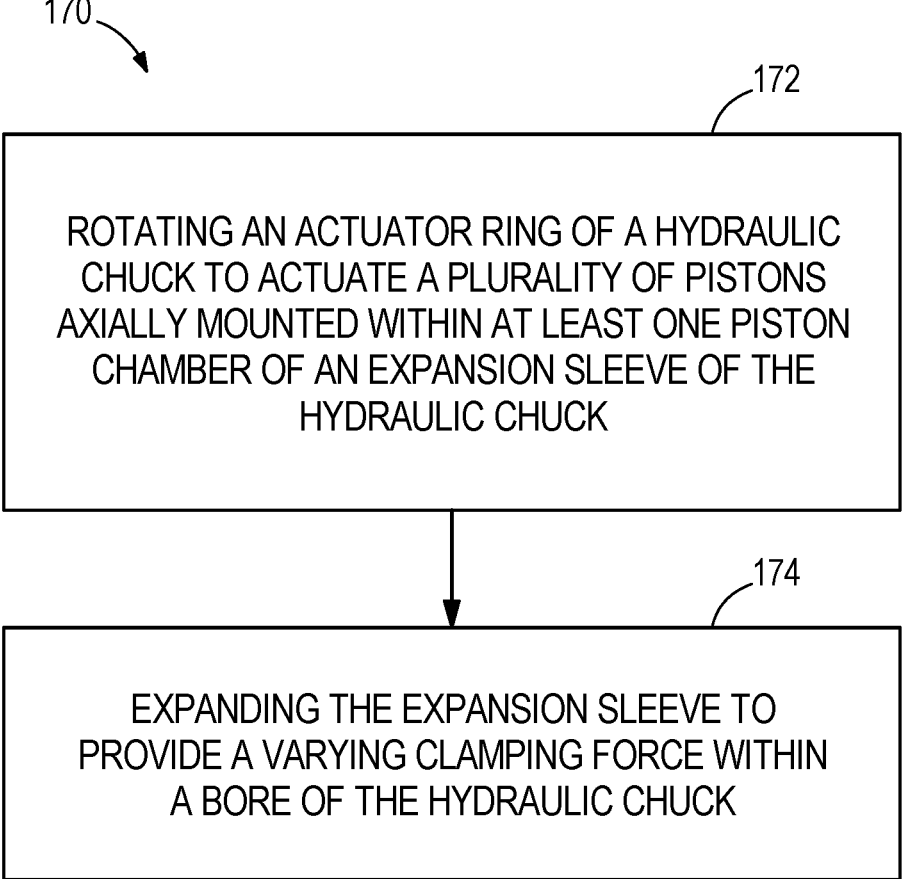
FIG. 6 illustrates a flowchart showing one embodiment of a method of hydraulically actuating a hydraulic chuck.

FIG. 6 illustrates a flowchart disclosing one embodiment of a method 170 of hydraulically actuating a hydraulic chuck. The method 170 may be utilized to hydraulically actuate either of the hydraulic chucks 10 and 110. In other embodiments, the method 170 may be utilized to hydraulically actuate varying hydraulic chucks. In step 172, an actuator ring of the hydraulic chuck may be rotated to actuate a plurality of pistons axially mounted within at least one piston chamber of an expansion sleeve of the hydraulic chuck. In step 174, the expansion sleeve may be expanded to provide a varying clamping force within a bore of the hydraulic chuck.

In one embodiment, the method 170 may further comprise simultaneously actuating the plurality of pistons as the actuator ring is rotated.

In another embodiment, the method 170 may further comprise actuating the plurality of pistons at different times as the actuating ring is rotated.

In an additional embodiment, the method 170 may further comprise the rotation of the actuator ring causing varying pressurizations.

In yet another embodiment, the method 170 may further comprise actuating the plurality of pistons varying amounts.

In still another embodiment, the method 170 may further comprise rotating the actuator ring between a tool support member of the hydraulic chuck and the expansion sleeve.

In an additional embodiment, the method 170 may further comprise rotating the actuator ring at a first end of the expansion sleeve, wherein a tool support member is attached to a second end of the expansion sleeve.

In additional embodiments, one or more steps of the method 170 may be varied in substance or order, one or more steps of the method 170 may not be followed, or one more additional steps may be added to the method 170. In still other embodiments, the method 170 may further vary.

One or more embodiments of the disclosure may reduce or eliminate one or more issues associated with one or more of the prior hydraulic chucks and/or their methods of operation. The modularity of the hydraulic chucks of the disclosure, using separately manufactured components which are attachable and detachable, may enable the replacement of a damaged component without having to replace the entire hydraulic chuck. For instance, if the expansion sleeve is damaged, a replacement expansion sleeve can be attached to the actuating ring and tool support member without having to replace the entire hydraulic chuck. Similarly, if the tool support member is damaged, a replacement tool support member can be attached to the actuating ring and expansion sleeve without having to replace the entire hydraulic chuck. Likewise, if the actuating ring is damaged, a replacement actuating ring can be attached to the expansion sleeve and tool support member without having to replace the entire hydraulic chuck. Moreover, using multiple pistons in the hydraulic chucks of the disclosure may assist with shorter stroke length, may provide quick clamping and de-clamping, and may provide flexibility and configurability of design parameters. For instance, using multiple pistons in combination with an actuation ring having a cammed surface may allow for the clamping and de-clamping force to be varied at different stages of the actuation of the pistons. This may provide extreme design flexibility. Additionally, the hydraulic chucks of the disclosure may provide increases in the torque that can be applied due to the large surface area being used during clamping.

The Abstract is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in various embodiments for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separately claimed subject matter.

While particular aspects of the present subject matter described herein have been shown and described, it will be apparent to those skilled in the art that, based upon the teachings herein, changes and modifications may be made without departing from the subject matter described herein and its broader aspects and, therefore, the appended claims are to encompass within their scope all such changes and modifications as are within the true scope of the subject matter described herein. Furthermore, it is to be understood that the disclosure is defined by the appended claims. Accordingly, the disclosure is not to be restricted except in light of the appended claims and their equivalents.

The invention claimed is:

1. A hydraulic chuck comprising:
   an expansion sleeve comprising a bore;
   a plurality of pistons axially mounted in at least one piston chamber of the expansion sleeve, the expansion sleeve comprising a plurality of pressure chambers containing hydraulic fluid, the plurality of pressure chambers connected to different piston chambers and extending axially adjacent the bore; and an actuator ring rotatably mounted relative to the expansion sleeve, the actuator ring configured to actuate the plurality of pistons in the at least one piston chamber to hydraulicly expand the expansion sleeve to provide a varying clamping force within the bore.

2. The hydraulic chuck of claim 1 wherein the expansion sleeve comprises only one pressure chamber containing hydraulic fluid, the only one pressure chamber connected to the at least one piston chamber and extending axially adjacent the bore.

3. The hydraulic chuck of claim 1 wherein the plurality of pressure chambers comprise different pressurizations.

4. The hydraulic chuck of claim 1 wherein the plurality of pistons comprise different sizes.

5. The hydraulic chuck of claim 1 wherein the actuator ring comprises a cam profile which is configured to apply a non-constant level of hydraulic expansion to the expansion sleeve as the actuator ring is rotated relative to the expansion sleeve.

6. The hydraulic chuck of claim 1 further comprising a tool support member attached with the expansion sleeve.

7. The hydraulic chuck of claim 6 wherein the actuator ring is disposed between the tool support member and the expansion sleeve.

8. The hydraulic chuck of claim 6 wherein the expansion sleeve is disposed between the tool support member and the actuator ring.

9. The hydraulic chuck of claim 6 wherein the tool support member is attached directly to the expansion sleeve with a mechanical fit.

10. The hydraulic chuck of claim 6 wherein the tool support member is attached directly to the expansion sleeve with an interference fit.

11. The hydraulic chuck of claim 1 wherein the actuator ring is configured to simultaneously actuate the plurality of pistons in the at least one piston chamber to hydraulicly expand the expansion sleeve to provide a varying clamping force within the bore.

12. The hydraulic chuck of claim 1 wherein the actuator ring is configured to actuate at least some of the plurality of pistons in the at least one piston chamber at different times to hydraulicly expand the expansion sleeve to provide a varying clamping force within the bore.

* * * * *